United States Patent
Troyansky et al.

(10) Patent No.: US 8,635,458 B2
(45) Date of Patent: Jan. 21, 2014

(54) METHOD AND A SYSTEM FOR EMBEDDING TEXTUAL FORENSIC INFORMATION

(75) Inventors: Lidror Troyansky, Givataim (IL); Ofir Carny, Kochav-Yair (IL); Ariel Peled, Even-Yehuda (IL)

(73) Assignee: PortAuthority Technologies, Inc., San Diego, CA (US)

( * ) Notice: Subject to any disclaimer, the term of this patent is extended or adjusted under 35 U.S.C. 154(b) by 0 days.

(21) Appl. No.: 13/187,560

(22) Filed: Jul. 21, 2011

(65) Prior Publication Data

US 2011/0276877 A1 Nov. 10, 2011

Related U.S. Application Data

(62) Division of application No. 10/479,524, filed as application No. PCT/IL02/00464 on Jun. 16, 2002, now abandoned.

(60) Provisional application No. 60/342,086, filed on Dec. 26, 2001, provisional application No. 60/297,797, filed on Jun. 14, 2001.

(51) Int. Cl.
*G06F 21/00* (2013.01)

(52) U.S. Cl.
USPC .......................................................... 713/176

(58) Field of Classification Search
None
See application file for complete search history.

(56) References Cited

U.S. PATENT DOCUMENTS

| | | | |
|---|---|---|---|
| 5,467,447 A | 11/1995 | Vogel | |
| 5,513,264 A | 4/1996 | Wang et al. | |
| 5,629,770 A | 5/1997 | Brassil et al. | |
| 5,699,427 A | 12/1997 | Chow et al. | |
| 5,748,763 A | 5/1998 | Rhoads | |
| 5,761,686 A | 6/1998 | Bloomberg | |
| 5,861,619 A | 1/1999 | Horino et al. | |
| 5,949,885 A | 9/1999 | Leighton | |
| 6,636,615 B1 | 10/2003 | Rhoads et al. | |
| 6,782,509 B1 | 8/2004 | Hirayama et al. | |
| 6,785,815 B1 | 8/2004 | Serret-Avila et al. | |
| 7,047,411 B1 | 5/2006 | DeMello et al. | |
| 7,353,541 B1 | 4/2008 | Ishibashi et al. | |
| 2004/0189682 A1 | 9/2004 | Troyansky | |

FOREIGN PATENT DOCUMENTS

| | | |
|---|---|---|
| WO | WO 01/22652 | 3/2001 |
| WO | WO 02/103461 | 12/2002 |

OTHER PUBLICATIONS

Official Action Dated Dec. 2, 2008 From the US Patent and Trademark Office Re.: U.S. Appl. No. 10/479,524.
Official Action Dated Jun. 5, 2007 From the US Patent and Trademark Office Re.: U.S. Appl. No. 10/479,524.
Official Action Dated Aug. 11, 2006 From the US Patent and Trademark Office Re.: U.S. Appl. No. 10/479,524.
Official Action Dated Feb. 14, 2007 From the US Patent and Trademark Office Re.: U.S. Appl. No. 10/479,524.
Official Action Dated May 14, 2008 From the US Patent and Trademark Office Re.: U.S. Appl. No. 10/479,524.

(Continued)

*Primary Examiner* — Benjamin Lanier

(57) ABSTRACT

A method for automatically embedding information in a digital text, said method comprising: identifying a plurality of positions, in said digital text, that are suitable for introducing modifications into said digital text; identifying modifications suitable for introduction into at least some of said suitable positions in said digital text; selecting at least some of said identified modifications for introduction into said digital text, said selection of said modifications being operable to represent said information; and performing said selected modifications on said digital text, thereby to embed said information.

28 Claims, 9 Drawing Sheets

(56) References Cited

OTHER PUBLICATIONS

Official Action Dated Oct. 23, 2007 From the US Patent and Trademark Office Re.: U.S. Appl. No. 10/479,524.
Official Action Dated Jan. 11, 2010 From the US Patent and Trademark Office Re.: U.S. Appl. No. 10/479,524.
Official Action Dated Oct. 12, 2010 From the US Patent and Trademark Office Re.: U.S. Appl. No. 10/479,524.
Official Action Dated Jun. 15, 2009 From the US Patent and Trademark Office Re.: U.S. Appl. No. 10/479,524.
Official Action Dated Mar. 21, 2011 From the US Patent and Trademark Office Re.: U.S. Appl. No. 10/479,524.
Official Action Dated May 31, 2006 From the US Patent and Trademark Office Re.: U.S. Appl. No. 10/479,524.
Response Dated Mar. 3, 2011 to Official Action of Oct. 12, 2010 From the US Patent and Trademark Office Re.: U.S. Appl. No. 10/479,524.
Response Dated Dec. 9, 2009 to Official Action of Jun. 15, 2009 From the US Patent and Trademark Office Re.: U.S. Appl. No. 10/479,524.
Response Dated Jul. 12, 2010 to Official Action of Jan. 11, 2010 From the US Patent and Trademark Office Re.: U.S. Appl. No. 10/479,524.
Boneh et al. "Collusion-Secure Fingerprinting for Digital Data", Department of Computer Science, Princeton University, p. 1-13, 1996.
Brassil "Electronic Marking and Identification Techniques to Discourage Document Copying", IEEE Journal on Selected Areas in Communications, 13(8): 1495-1503, 1995.
Brassil et al. "Copyright Protection for the Electronic Distribution of Text Documents", IEEE Journal on Selected Areas in Communications, p. 1-22, 1995.

METHOD AND A SYSTEM FOR EMBEDDING TEXTUAL FORENSIC INFORMATION

RELATED APPLICATIONS

This application is a divisional of U.S. patent application Ser. No. 10/479,524 filed on Dec. 11, 2003, which is National Phase of PCT Patent Application No. PCT/IL02/00464 filed on Jun. 16, 2002, which claims the benefit of priority of U.S. Provisional Patent Application Nos. 60/342,086 filed on Dec. 26, 2001 and 60/297,797 filed on Jun. 14, 2001. The contents of the above applications are all incorporated herein by reference.

FIELD OF THE INVENTION

The present invention relates generally to the field of securing digital content. More specifically, the present invention deals with forensic methods for breach analysis and business espionage mitigation.

BACKGROUND OF THE INVENTION

Modern businesses and industries relay heavily on digital content as a primary mean of communication and documentation. Digital content can be easily copied and distributed (e.g., via e-mail, instant messaging, peer-to-peer networks, FTP and web-sites), which greatly increase hazards such as business espionage and data leakage. There is therefore great interest in methods that would mitigate risks of digital espionage and unauthorized dissemination of proprietary information.

In general, one can divide the counter digital espionage methods into two categories: proactive methods, that increase the difficulty of unauthorized copying and distribution of digital documents, and reactive methods, the latter providing means for detection and tracking of breached content, for forensic purposes and for tracking and incrimination of suspects, thereby to provide an effective deterrence.

Current attempts to automatically mitigate espionage are focused on proactive methods. While these methods can be helpful in some cases, it is generally believed that any proactive method may be eventually circumvented, and there is a strong need to complement these methods with reactive means, that provide for forensic evidence and a means for incrimination of suspects. An effective forensic measure should provide an effective means to determine the exact source of a breached document.

In the context of secure distribution of multimedia content, some forensic methods require that unique, personalized digital watermarks, dubbed "fingerprint", be embedded into each copy of the data before it is sent to the final user, allowing for binding of each copy with an authorized and accountable user. Numerous methods for personalized watermarking of multimedia files, such as video and audio contents, exist: in these cases, there exists a high level of redundancy that allows embedding of watermarks into the media, in a manner that will not reduce the quality of the media and yet will be robust to both malicious and non-malicious attacks. Some methods for embedding steganograms (hidden messages) inside a text also exist, and can be traced back to far antiquity. However, since the amount of redundancy in text is much smaller then the redundancy in audio or video, it is harder to embed in a robust manner such hidden messages in a text, in particular if the embedding process is to be done automatically, and current methods for automatic embedding of steganograms in text are usually based on altering the number of spaces in the end of line, which are highly vulnerable to format changing.

In many cases, documents are prepared by groups, where each member of the group introduces his own modifications into a document. An efficient document forensic system should consider this fact, and embed modifications that are as robust as possible against casual editing while allowing for seamless group-working on copies that contain somewhat different versions of the documents.

Embedding steganograms into text is also important for copyright protection of digital books: Illegal copying and distribution of digital books, also known as "e-books", has been prevalent in recent years, especially using the Internet. This illegal copying and distribution is an infringement of copyright protection laws and cause financial damage to the rightful owners of the content. It is therefore of great interest to find methods that would stop or at least reduce illegal copying and/or distribution of digital texts without offending rightful usage. To-date, no such method is in use.

Another important aspect of a forensic technique is robustness: a forensic method should be robust against consequential changes in the substance and preferably against deliberate attempts to remove the forensic marks. Current methods usually lack an adequate level of robustness.

Prior art regarding usage of forensic data for tracking breaches and espionage detection include the usage of manual insertion of small modifications in various copies of the document, as well as the insertion of identification data in the meta-data of the binary file and altering the number of spaces in the end of the lines of the text. Such methods do not provide an adequate solution to the problem of modern businesses, since the rate of production of copies of digital documents renders the cost of manual insertion of modifications prohibitive, and the plurality of formats in which the information can be represented render metadata based methods ineffective, since file metadata is often altered when the format of the file is changed.

There is thus a recognized need for, and it would be highly advantageous to have, a method and system that allow personalized watermarking of text in digital documents, which will overcome the drawbacks of current methods as described above.

SUMMARY OF THE INVENTION

According to a first aspect of the present invention there is provided a method for automatically embedding information in a digital text, the method comprising:

identifying a plurality of positions, in the digital text, that are suitable for introducing modifications into the digital text;

identifying modifications suitable for introduction into at least some of the suitable positions in the digital text;

selecting at least some of the identified modifications for introduction into the digital text, the selection of the modifications being operable to represent the information; and performing the selected modifications on the digital text, thereby to embed the information.

In a preferred embodiment of the present invention, the method further comprises the approval of the selection of modifications in the digital text.

In a preferred embodiment of the present invention, the modifications include at least one of the following:

replacing a character with a substantially similar looking character;

replacing a character with a similarly looking character, where the characters only differ in their digital representation;

replacing a character with a similarly looking character, where the characters only differ in their Unicode representation;

removing an unprintable character;
adding an unprintable character;
replacing an unprintable character;
exchanging between at least two possible representations of an end of a paragraph; and exchanging between at least two possible representations of an end of a line.

In a preferred embodiment of the present invention, the modifications include at least one of the following:

modifying the number of spaces between words;
modifying the number of spaces between paragraphs;
modifying the number of spaces between lines;
modifying the number of spaces at a line ending;
modifying the number of tabs at a line ending;
adding at least one space character at a line ending;
adding at least one tab character at a line ending;
modifying the size of spaces between words;
modifying the size of spaces between paragraphs;
modifying the size of spaces between lines;
modifying the size of spaces between characters;
modifying the number of spaces representing a tab character;
modifying the place of a tab;
replacing a tab character with at least one space;
replacing at least one space with a tab character; and modifying the size of a tab character.

In a preferred embodiment of the present invention, the modifications include at least one of the following:

modifying the font of at least one character;
modifying the color of at least one character;
modifying the size of at least one character;
modifying a property of at least one character;
modifying the background of the digital text;
modifying the background of at least one character;
replacing a character with an image similar to the character;
modifying the digital representation of the digital content;
modifying the internal logical division in the digital representation of the digital content;
modifying the classification of a unit in the internal logical division in the digital representation of the digital content;
modifying a property of a unit in the internal logical division in the digital representation of the digital content;
modifying the classification of a paragraph; and modifying a property of a paragraph.

In a preferred embodiment of the present invention, the modifications include at least one of the following:

punctuation modifications;
spelling modifications;
spelling modifications that exchange between different valid spellings of the same word; and spelling modifications that exchange between at least one valid spelling of the a word and at least one invalid spelling of the word.

In a preferred embodiment of the present invention, the modifications include at least one of the following:

exchanging between some of the following versions of a word built from at least two words: a concatenated version, a version that uses a hyphen for separation and a version separated by a space;
spelling modifications that exchange between an acronym and full verbatim versions of the acronym;
spelling modifications that exchange between at least one shortened version of a word and the full version of the word;
exchanging between a correct version of a word and at least one other word, the other words have similar pronunciation to the correct word;
exchanges between synonyms;
modifications that effect an order of elements within the digital text;
modifications that effect an order of words;
modifications that effect an order of sentences; and modifications that effect an order of paragraphs.

In a preferred embodiment of the present invention, the modifications include at least one of the following:

modifications that effect capitalization;
removing at least one word;
adding at least one word;
replacing at least one word;
modifications to diagrams embedded in the digital text;
addition of diagrams embedded in the digital text;
removal of diagrams embedded in the digital text;
modifications to the shadow of at least one character;
exchanging between at least two different grammatical structures; and modifying the phrasing of at least a part of the digital text such that the changed version remains similar to the original version.

In a preferred embodiment of the present invention, the identification of modifications is performed in a manner which takes into consideration limitations imposed by the digital representation of the digital text.

In a preferred embodiment of the present invention, the embedded information contains information suitable to identify at least one entry in a database, the database entry containing additional information.

In a preferred embodiment of the present invention, the embedded information contains information operable to identify at least one recipient of the digital text.

In a preferred embodiment of the present invention, the method further comprises the step of selecting different combinations of the modifications to form different copies of the digital text such that a plurality of recipients of the digital text each receive a personally modified version of the digital text, the different combinations within the embedded information being operable to uniquely identify a respective recipient of each copy.

In a preferred embodiment of the present invention, the embedded information contains information operable to identify at least one editor of the digital text.

In a preferred embodiment of the present invention, the method further comprises automatically performing the step of identifying positions in the digital text.

In a preferred embodiment of the present invention, the step of identifying positions in the digital text, is performed manually.

In a preferred embodiment of the present invention, the step of identifying positions in the digital text, is performed such that the positions are distributed in a predefined manner within the digital text.

In a preferred embodiment of the present invention, the predefined manner of distribution of the positions within the digital text is a distribution where all portions of the digital text larger than a given size contain enough embedded information to reconstruct a predetermined subset of the embedded information.

In a preferred embodiment of the present invention, the desirable manner of distribution of the positions within the digital text is a distribution defined such that removal of a significant number of the positions from the digital text results in significant degradation of the value of the digital text.

In a preferred embodiment of the present invention, at least part of the embedded information is encoded using at least one of the following:
 error detection code;
 error correction code;
 cryptographic signature; and
 cryptographic encryption.

In a preferred embodiment of the present invention, the identification of suitable modifications is performed in a manner which takes into account the limitations imposed by requirements concerning the quality of the digital text and on the resemblance of the modified text to the original version of the digital text.

In a preferred embodiment of the present invention, the selection of the identified modifications is performed so that at least two potential modifications are grouped together, and where several versions of the digital text are produced with different embedded information, the group of changes being performed in unison, such that if a modification which is part of the group is performed on one version of the text, all other modifications in the group are also performed on the version.

In a preferred embodiment of the present invention, the modifications in the group are in proximity to each other within the digital text.

In a preferred embodiment of the present invention, the selection of modifications is performed such as to take into account the amount of information which is to be embedded in the digital text.

In a preferred embodiment of the present invention, the amount of information which is to be embedded in the digital text is dictated by at least one of the following considerations:
 the amount of actual information which needs to be represented by the information embedded in the digital text;
 the usage of error correction code;
 the usage of error detection code;
 the requirements on robustness;
 the required number of different versions of the digital text;
 the need to embed a database index; and
 the need to embed versioning information.

In a preferred embodiment of the present invention, the embedded information contains at least one of the following:
 versioning information;
 editing history information;
 forensics information;
 transfer history information; and
 information operable to identify and categorize the digital text.

In a preferred embodiment of the present invention, the embedded information is substantially imperceptible.

According to a second aspect of the present invention there is provided A method for monitoring digital text by utilizing information embedded in digital texts, the method comprising:
 embedding information in digital texts it is desired to monitor;
 detecting an attempt to use a specific digital text;
 determining whether the specific digital text contains the embedded information;
 determining whether the specific digital text is one of the digital texts it is desired to monitor according to the embedded information; and
 reading the information embedded in the specific digital text.

In a preferred embodiment of the present invention, the embedded information is operable to identify the source of the digital text when the digital text is found in at least one of the following states:
 in the possession of an unauthorized party;
 in an unauthorized location;
 in an unsecured location; and
 in an unsecured format.

In a preferred embodiment of the present invention, the embedded information is further operable to identify at least part of the path in which the digital text reached the state.

In a preferred embodiment of the present invention, the method further comprises controlling the usage of the digital text according to the embedded information.

In a preferred embodiment of the present invention, the embedded information contains at least one limitation about the usage of the digital text.

In a preferred embodiment of the present invention, the limitations comprising at least one of the following:
 limitations about the time in which it is allowable to use the digital text;
 limitations about where it is allowable to use the digital text;
 limitations about how it is allowable to use the digital text; and
 limitations about who is allowed to use the digital text.

In a preferred embodiment of the present invention, the controlling is dependent on at least one of the following:
 the identity of the user performing the usage;
 the usage rights of the user performing the usage;
 the identity of the digital text;
 the risks associated with the usage;
 the security mechanisms used in the usage; and
 the type of usage.

In a preferred embodiment of the present invention, the limitations on how the text is used comprise limitations to at least one of the following:
 viewing the digital text;
 editing the digital text;
 transferring the digital text; and
 storing the digital text.

There is also provided in accordance to a preferred embodiment of the present invention A system for controlling usage of a digital text by utilizing information embedded in digital text the system comprising:
 at least one computerized information embedding unit operable to embed the information in the digital texts;
 at least one computerized information reading unit operable to read the information embedded in the digital texts;
 at least one computerized digital text usage unit operable to use the digital texts; and
 at least one computerized control unit operable to:
 receive notification from the computerized digital text usage unit, the notification indicating the digital text;
 receive information from the computerized information reading unit, the information dependent on the information embedded in the digital text and read by the computerized information reading unit; and
 instruct the computerized digital text usage unit on a usage policy for the digital text, the usage policy dependent on the information received from the computerized information reading unit.

In a preferred embodiment of the present invention, the embedded information is operable to identify the source of the digital text when the digital text is found in the possession of an unauthorized party.

In a preferred embodiment of the present invention, the system further comprises at least one database containing at least one entry containing additional information, and where the embedded information is operable to be correlated to the entry.

In a preferred embodiment of the present invention, the system further comprises at least one computerized document management unit operable to maintain information about digital texts.

In a preferred embodiment of the present invention, the computerized document management unit is operable to maintain at least one of the following types of information:
- versioning information;
- editing history information;
- usage policy information;
- transfer history information; and
- category information.

In a preferred embodiment of the present invention, the computerized document management system is operable to interact with the computerized control unit.

In a preferred embodiment of the present invention, the interaction comprises at least one of the following:
- the computerized control unit informing the computerized document management unit about usage of the digital text; and
- the computerized document management unit sending information to the computerized control unit, the information sent operable to be used by the computerized control unit to create the usage policy.

In a preferred embodiment of the present invention, the usage policy comprises at least one of the following:
- preventing the usage;
- restricting the usage;
- monitoring the usage;
- reporting the usage; and
- allowing the usage.

In a preferred embodiment of the present invention, the usage policy depends on at least one of the following:
- the identity of the user performing the usage;
- the usage rights of the user performing the usage;
- the identity of the digital text;
- the identity of the editors of the version of the digital text used in the usage;
- the risks associated with the usage;
- the security mechanisms used in the usage; and
- the type of usage.

In a preferred embodiment of the present invention, the usage comprises at least one of the following:
- viewing the digital text;
- editing the digital text;
- transferring the digital text; and
- storing the digital text.

In a preferred embodiment of the present invention, the embedded information contains first indication information, the first indication information indicating at least one element in a group, and where the embedded information further contains second indication information, the second indication information indicating the group.

In a preferred embodiment of the present invention, the embedded information contains a plurality of information elements, and where a subset of the information elements are embedded into the digital text such that the subset of the information elements is encoded in a manner more resilient to a change in the digital text than the embedding of another subset of the information elements.

In a preferred embodiment of the present invention, the system further comprises a computerized transformer unit operable to receive a version of a digital text, the version contains both editing changes and embedded information, and where the computerized transformer unit is further operable to produce a version of the digital text which contains both the editing changes and different embedded information.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DETAILED DESCRIPTION OF PREFERRED EMBODIMENTS

Figure 1:
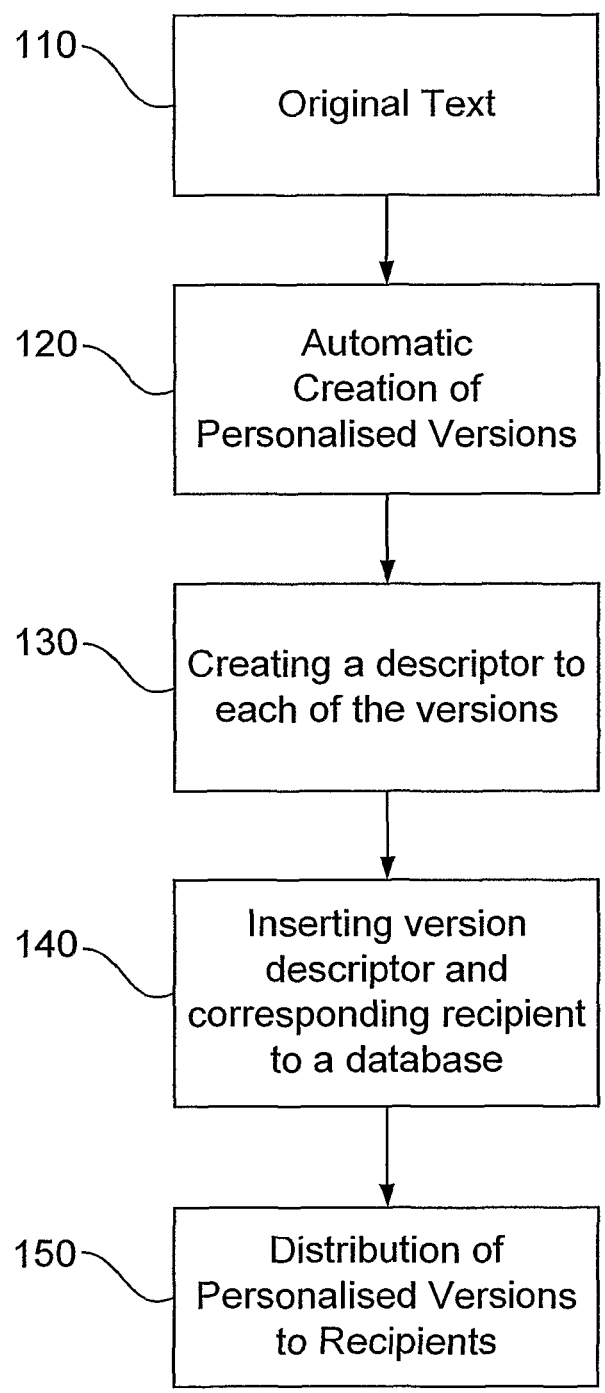
FIG. 1 is a flow-chart showing the sequence of steps for the insertion of forensic information in digital textual document, constructed and operative in accordance with a preferred embodiment of the present invention.

The present invention seeks to provide a system and a method for on-line, real-time personalized marking of digital content, with an emphasis on text, in order to allow tracking and detection of sources of leaks and breaches of confidential and proprietary information, thereby mitigating the hazards of digital espionage and unauthorized dissemination of proprietary information. The system and the methods can also be used as a part of a digital rights management system. According to a first aspect of the present invention, a method based on distributing a preferably unique copy to each of the recipients, thereby allowing tracing and detecting the sources of breaches, is described. In a preferred embodiment of the invented method, a technique for maintaining the coherency and integrity of the personalized documents while working in groups is also described.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

Reference is first made to FIG. 1, which is a simplified flowchart of the basic steps in practicing a preferred embodiment of the present invention: The original document or text is presented to the system (stage A, as indicated by 110) and undergoes an automatic versioning phase in which several personalized versions of the original document or text are created, based on modifying elements of the text or the document. (stage B, as indicated by 120). For each of the versions a version descriptor is created (stage C, as indicated by 130). The version descriptor and corresponding recipient are then inserted to a database (stage D, as indicated by 140) and the personalized versions are then distributed to the various recipients (stage E, as indicated by 150).

Some examples for modifying techniques operable for versioning are:

- Punctuation: additional/missing comas, replacing commas "," with semi-colons ";" and vice versa, concatenation of sentences, usage of ", which" versus "that", usage of parentheses instead of commas and vice-versa etc.
- Spelling: if there is more then one way to spell a word (e.g., color/colour, can not/cannot, foreign words, names, etc.) then such a word is a candidate for modifying.
- Exact synonyms, i.e., words that can be replaced with other words without causing appreciable change (e.g., "for example" instead of "e.g.").
- Altering the number or size of spaces between words, lines and characters.
- Altering some properties of some of the fonts.
- Deliberate typos, especially in homophonic words.
- Rephrasing of sentences and sub-sentences.
- Rephrasing of paragraphs.
- Capitalization (e.g. after ":")
- Additional words.
- Replacing a character with a substantially similar looking character;
- Replacing a character with a similarly looking character, wherein said characters only differ in their digital representation;
- Replacing a character with a similarly looking character, wherein said characters only differ in their Unicode representation;
- Removing an unprintable character;
- Adding an unprintable character;
- Replacing an unprintable character;
- Exchanging between possible representations at an end of a paragraph;
- Exchanging between possible representations at an end of a line;
- Modifying the number of spaces between paragraphs;
- Modifying the number of spaces at a line ending;
- Modifying the number of tabs at a line ending;
- Adding a space character at a line ending;
- Adding a tab character at a line ending;
- Modifying the size of spaces between paragraphs;
- Modifying the size of spaces between lines;
- Modifying the number of spaces representing a tab character;
- Modifying the place of a tab;
- Replacing a tab character with at least one space;
- Replacing a space with a tab character;
- Modifying the size of a tab character;
- Modifying the font of a character;
- Modifying the color of a character;
- Modifying the size of a character;
- Modifying a property of a character;
- Modifying the background of the digital text;
- Modifying the background of a character;
- Replacing a character with an image similar to a character;
- Modifying the digital representation of the digital content;
- Modifying the internal logical division in the digital representation of the digital content;
- Modifying the classification of a unit in the internal logical division in the digital representation of the digital content;
- Modifying a property of a unit in the internal logical division in the digital representation of the digital content;
- Modifying the classification of a paragraph;
- Modifying a property of a paragraph.
- Exchanging between some of the following:
- versions of a word built from at least two words:
    - a concatenated version,
    - a version that uses a hyphen for separation, and
    - a version separated by a space;
- Spelling modifications that exchange between an acronym and a full verbatim versions of said acronym;
- Spelling modifications that exchange between at least one shortened version of a word and the full version of said word;
- Modifications that exchange between a correct version of a word and at least one other word, the other words having similar pronunciation to the correct word;
- Exchange between synonyms;
- Modifications that effect order of elements within said digital text;
- Modifications that effect the order of words;
- Modifications that effect the order of sentences;
- Modifications that effect the order of paragraphs;
- Modifications that effect capitalization;
- Removing a word;
- Adding a word;
- Replacing a word;
- Modifications to diagrams embedded in the digital text;
- Addition of diagrams embedded in the digital text;
- Removal of diagrams embedded in the digital text;
- Modifications to the shadow of a character;
- Exchanging between different grammatical structures;
- Modifying the phrasing of a part of the digital text such that the changed version retains its similarity to the original version.

The position of potential candidates for modifying can be performed either manually or by using specialized software.

In another aspect of the present invention, another level of marking can be added, by using watermarks on the background of the text, and in particular, the portion of the background behind words.

In general, not all the modifying process operable for versioning would have the same merit: for example, deliberate typos reduce the quality of the document and are susceptible to spelling correction. Altering some properties of fonts and size of spaces between characters may not be robust against format changing etc. One can therefore define strength, or robustness parameter to each modification, as well as a quality factor that will define to what extent the modifying process reduces the quality of the content.

Figure 2:
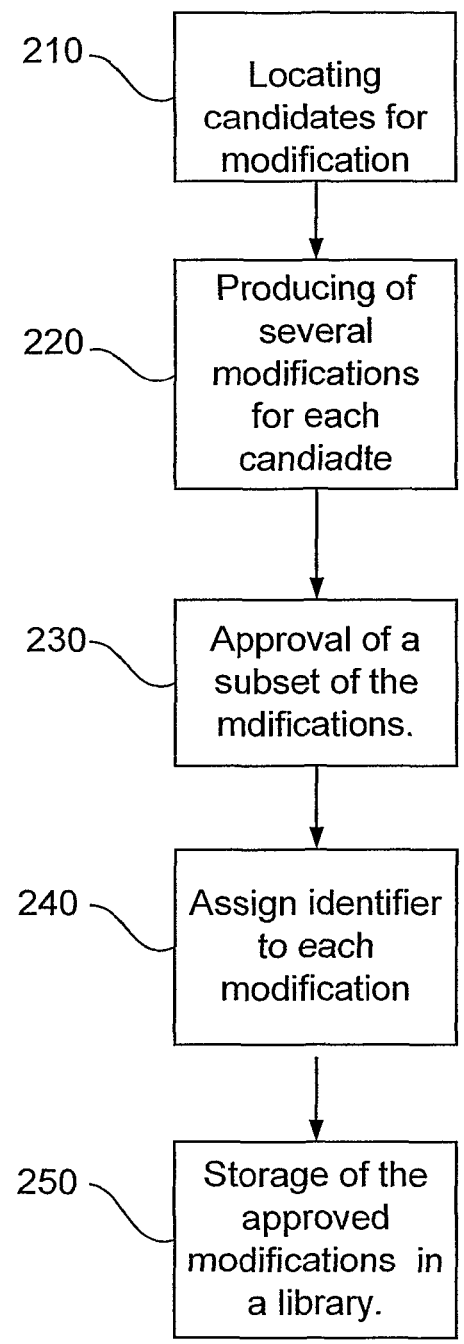
FIG. 2 is a flow-chart showing the sequence of steps for creation of personalized text documents, constructed and operative in accordance with a preferred embodiment of the present invention.

FIG. 2 illustrate a flowchart of the process of preparing versions of various segments, according to a preferred embodiment of the present invention. At the first step, candidates for modifying are located (stage A, as indicated by 210), after that, two or more modifications of each of the segments is produced, e.g., using one or more of the methods described above or the more extensive list of versioning techniques described elsewhere in this disclosure. (stage B, as indicated by 220). The modifications are preferably undergone a stage of approval, either manually (e.g., by the author of the text) and/or automatically (e.g., by another software component). The stage of approval is indicated as stage C, as indicated by reference numeral 230 in FIG. 2). Each of the approved modifications is then identified by a modification identifier (stage D, as indicated by 240) and is stored in a library on a storage device (stage E, as indicated by 250).

Figure 3:
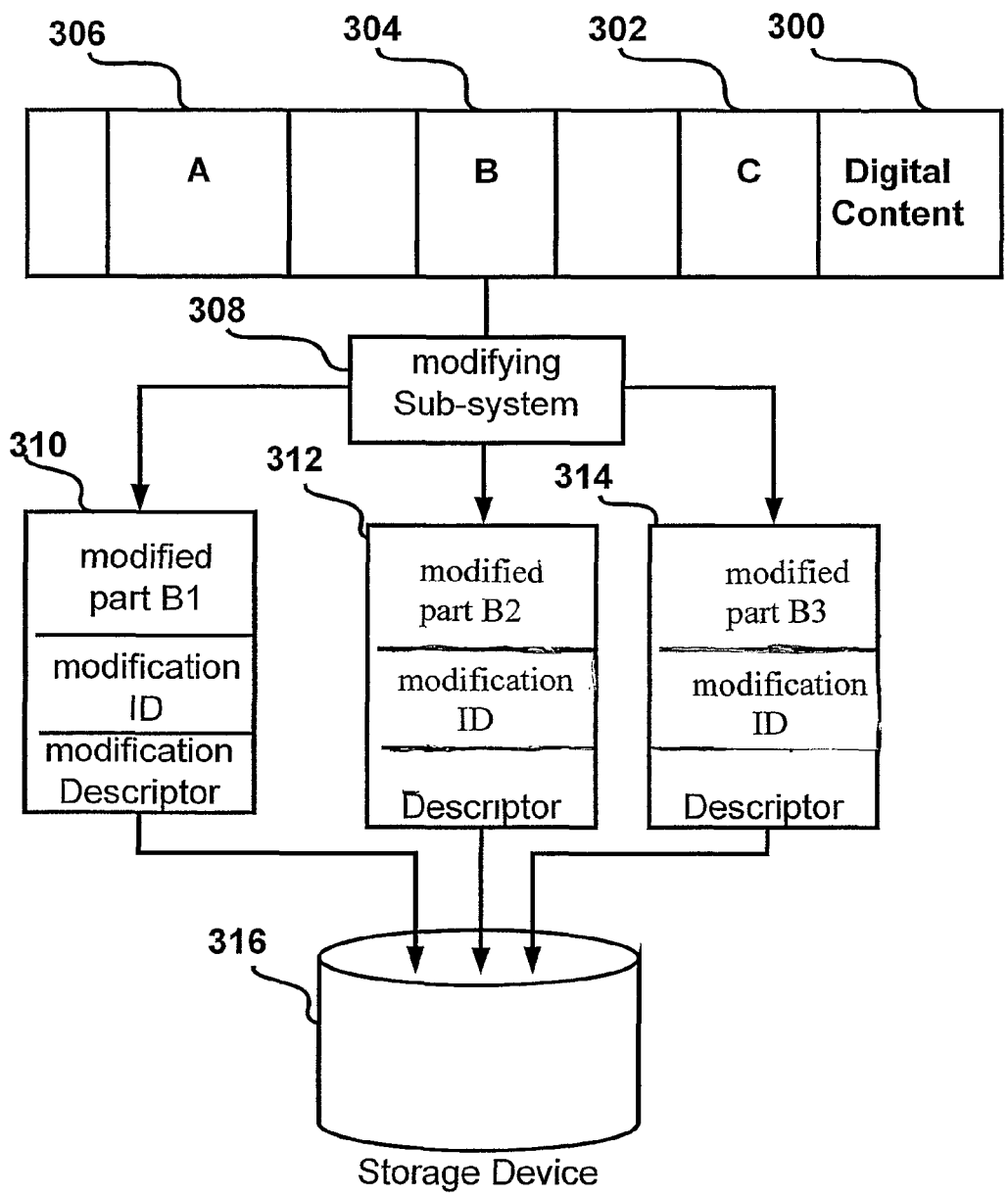
FIG. 3 is an illustration of a simplified pre-versioning system, constructed and operative in accordance with a preferred embodiment of the present invention.

Reference is now made to FIG. 3, which illustrates a process in which a set of modifications of a certain position is constructed and stored according to a preferred embodiment of the present invention. The position denoted by B, indicated by 304, is used by the modifying subsystem 308 in order to produce the modifications together with the corresponding identifier and descriptor: modification B1, indicated by 310, modification B2, indicated by 312 and modification B3, indicated by 314. The modifications, together with the corresponding identifier and descriptor are then stored in the storage device 316 for future usage.

The modifying process can also be done by grouping together several optional modifications into one set of logical symbols. The cardinality of this set is the product of the number of modifications in each optional position. E.g., if, within the group, there are four possible modifications for punctuation, three possible synonyms for a given word and two possible spellings, then there are total of 4*3*2b=24 possible modifications in the group. If we assign a logical symbol to each version, then the cardinality of the set of symbols is 24.

Grouping of optional modifications may also be based on their order within the text. In this case, the content can be divided into segments, and the possible modifications within each segment may be grouped together to form a set of logical symbols. Each symbol in a set for a given segment is unique from each other symbol in the set. Sets of pre-versioned data segments associated with different segments of the salient fraction may, but are not required to, contain segments with the same symbols. That is, each set contains an "alphabet" of logical symbols that may or may not be the same alphabet as symbols contained within other sets associated with other segments. For example, a set associated with a first data segment may contain logical symbols "A", "B" and "C," while a set associated with a second segment may contain symbols "C", "1" and "3". All the sets of pre-encrypted data segments are referred to as a library.

In general, it is advantageous to be able to identify a versioned copy based on a small portion of the text. In order to achieve that goal, the modifications between copies should be distributed along the text as uniformly as possible.

As content is prepared for distribution to an authorized user according to the present embodiments, a unique copy of the content, which is preferably correlated with some aspects of the details of authorized user, is produced. The unique content is preferably produced by selecting a specific sequence of modifications of the various positions. Denoting the j-th modification of the i-th modification by $V(i,j)$, a personalized version is created by selecting the sequence $V(1,k_1)$, $V(2,k_2)$, $V(3,k_3)$, $V(4,k_4)$ ..., where the sequence $k_1, k_2, \ldots$, which determines which modification in each position is selected, provides a unique characterization of the personalized copy. The desired document may then be produced by inserting the corresponding version of each segment in the appropriate position.

The method may also be used to robustly embed other (not necessarily unique) information.

Figure 4:
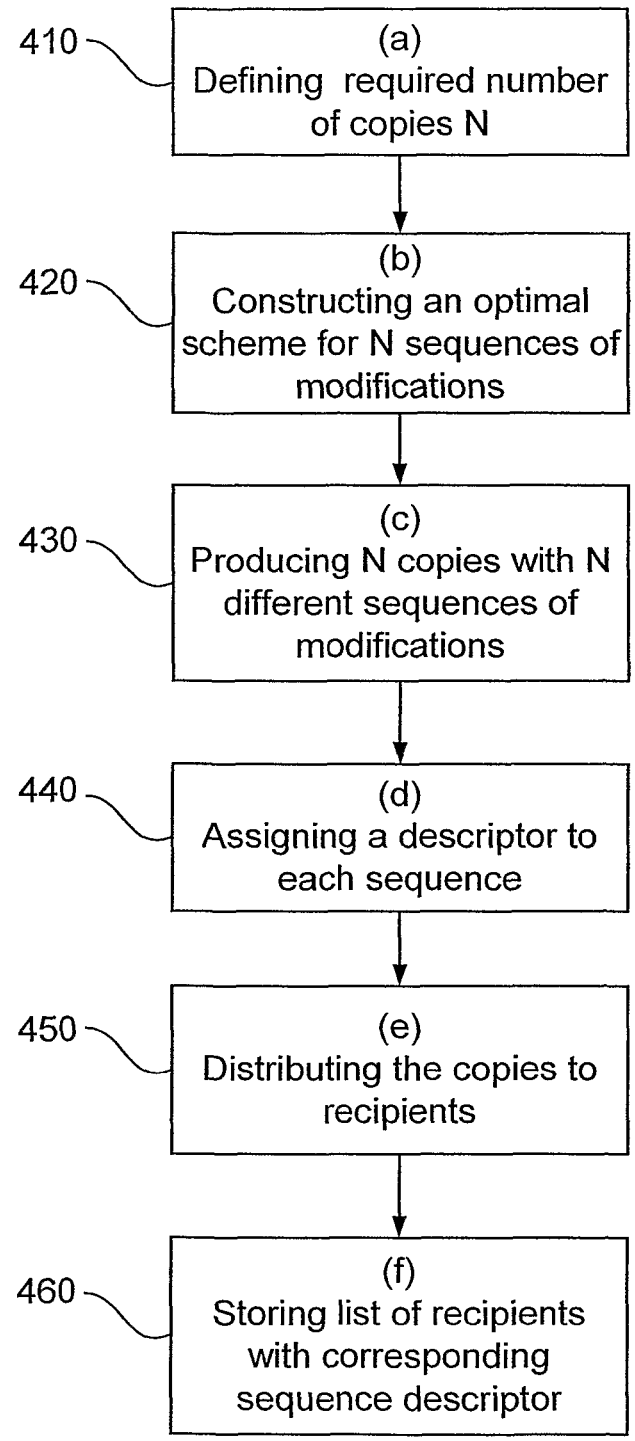
FIG. 4 is a flow-chart showing the sequence of steps for embedding hidden messages into a digital textual document, constructed and operative in accordance with a preferred embodiment of the present invention.

Turning now to FIG. 4, there is shown a block diagram of the steps for preparing a text to on-line version system that allows a series of uniquely identifiable individual versions of a text to be produced, distributed and then uniquely identified. At the first stage (stage A, as indicated by 410), the number of required copies, N, is defined. At the next stage (stage B, as indicated by 420), an optimized scheme for creation of N sequences of modifications is evaluated. In general, an optimal scheme would be such that the N copies are as remote as possible from one another, i.e., that it would be as hard as possible to make one personalized version indistinguishable from another, in the sense that the number of modifications, weighted by the robustness factor is maximal, while keeping the quality of the versions as high as possible. Such a notion of an optimal scheme is known from the domain of error-correcting code. The optimization process may be based on exhaustive search or on a more structured search process in the combinatorial space.

After defining the optimal scheme, N different copies, with N different sequences of modifications are produced (staged C, indicated as 430). To each of the personalized version an indicator is attached, that may be correlated with some details of the recipients (staged D, indicated as 440). The copies are then distributed to the various recipients (stage E, indicated as 450) and the list of recipients, together with the corresponding descriptors, are stored in a database for further usage (stage F, indicated as 460). Such further usage may for example include identifying the source of a version that was distributed without an authorization and the like.

Figure 5:
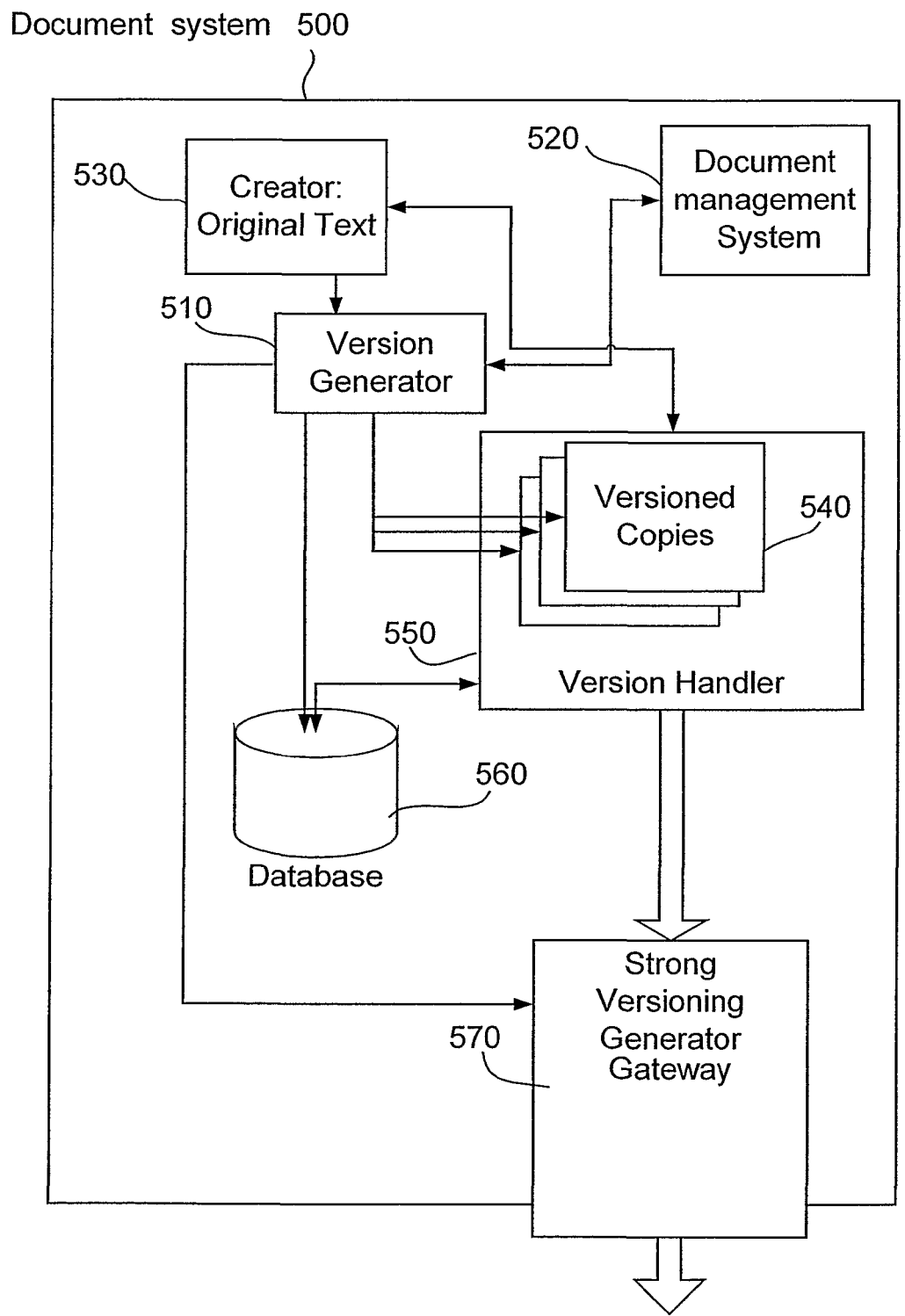
FIG. 5 is a flow-chart showing the sequence steps for marking and pre-encryption of a set of data segments, constructed and operative in accordance with a preferred embodiment of the present invention.

FIG. 5 schematically illustrates a document system for managing the creation and distribution of individualized versions of documents, which is referred to hereinafter as system 500. According to the configuration illustrated in FIG. 5, System 500 includes a version generator 510, which is preferably monitored by the document system interface 520. The original text created by the original text creator 530, is sent to the version generator 510, which produces versioned copies 540, such that any recipient may obtain a different version of the document. The version generator also sends the descriptors of the various versions to the database 560. The version handler 550 obtains information that characterizes the differences between the various versions and the original text. The database 560 obtains the version descriptors and the correlations between versions and recipients, in order to allow tracking and detection of the breached documents.

The version handler 540 handles cases in which versioned text documents are transferred between recipients and/or to the original creator. The version handler compares the versions of the sender and the recipient, and modifies the sender's version accordingly, thereby allowing seamless group work on the document. In another preferred embodiment of the present invention the information is embedded in a cryptographic format (encrypted and/or signed) thereby preventing certain harmful scenarios, such as framing of an innocent user. This encryption and/or signing should be made to the data before using any kind of error correction encoding, since otherwise the error correction code may be rendered ineffective.

Note that when using a database, embedding may be done in advance and the database entry may be updated after a pre embedded copy is allocated to a certain recipient.

Figure 6:
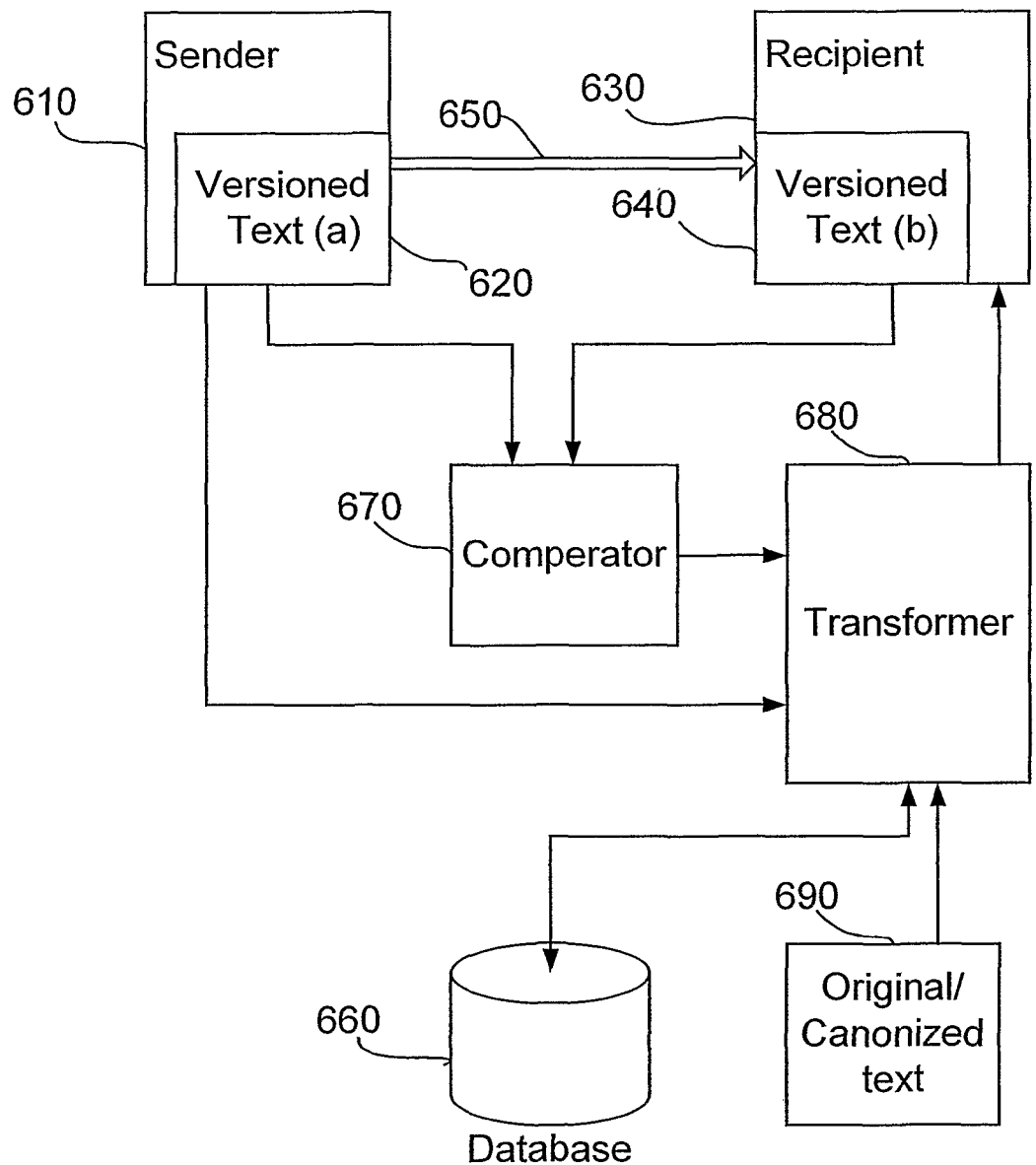
FIG. 6 is a simplified block-diagram describing group working on personalized documents, as part of a preferred embodiment of the present invention.

Reference is now made to FIG. 6, which is a simplified scheme of a preferred embodiment of the version handler 540, which allows group working on versioned documents using document-handling system 500. The sender 610, who whishes to send his working version 620 to a recipient 630 with working version 640, sends his working copy to the comparator 670 and the transformer 680. The comparator 670 compares the versioned text 620 with the reference version of the text 690 in order to locate the modifications that characterized the sender version, and which still remain after the edit changes in the document that the sender might introduce while working on his version of the document. The transformer 680 preferably uses data from the database 660 and the comparator 670 in order to transform the personalization scheme of the sender to a personalization scheme of the recipient, in a transparent or seamless manner. This is implemented by first removing the specific personalized modifications that were introduced by the version generator and which may still remain in the sender working version, and then producing the modifications to characterize the recipient copy which would have still remained in the working version of the sender had they been there in the beginning.

Note that if the original personalization scheme was rendered ineffective due to substantial changes in the original text that a writer introduces in his/her copy, then the changed text itself may contain a sufficient level of differences, which enables the identification of the copy.

An alternative approach may consist of taking advantage of the fact that changes to the text are usually localized. This can either be done by using a specialized error correction code designed for correcting localized errors, or by embedding a simple error detection code on localized chunks of data (e.g. paragraphs), and verifying them before extraction of the embedded information (preferring the errorless chunks for extraction) A prior (and in many cases alternative) step may be to look for similarities between chunks in order to know what is the origin of chunks in order to ease the practice of verifying the chunks.

In order to reduce the ability of malicious tampering by recipients, it may be beneficial to embed personalized information for each subgroup of recipients or to some of those subgroups, where the embedding of information for said subgroups should be independent, instead of embedding personalized information on each copy for each recipient. Thus if a subgroup of recipients attempts to remove the specific information for its members by comparing their respective copies, and attempting to remove the information identified as differences, they still can be identified by the subgroup's information, which will be identical in all their copies. In certain cases, embed personalized information for each (proper or otherwise) subgroup of recipients or to some of those subgroups (the embedding of information for said subgroups should be independent) personalized information may become redundant; because an individual recipient may be uniquely identified by the intersection of the subgroups, she (or he) is member of.

Note that some attacks on the content may consist of canonizing the text in some manner, thus it is of great benefit to embed the watermark independently using a number of methods, or with an error correction code that is designed to handle a complete removal of all information encoded using some of the methods. Thereby create enough redundancy in order to mitigate most canonizing attacks.

Figure 7:
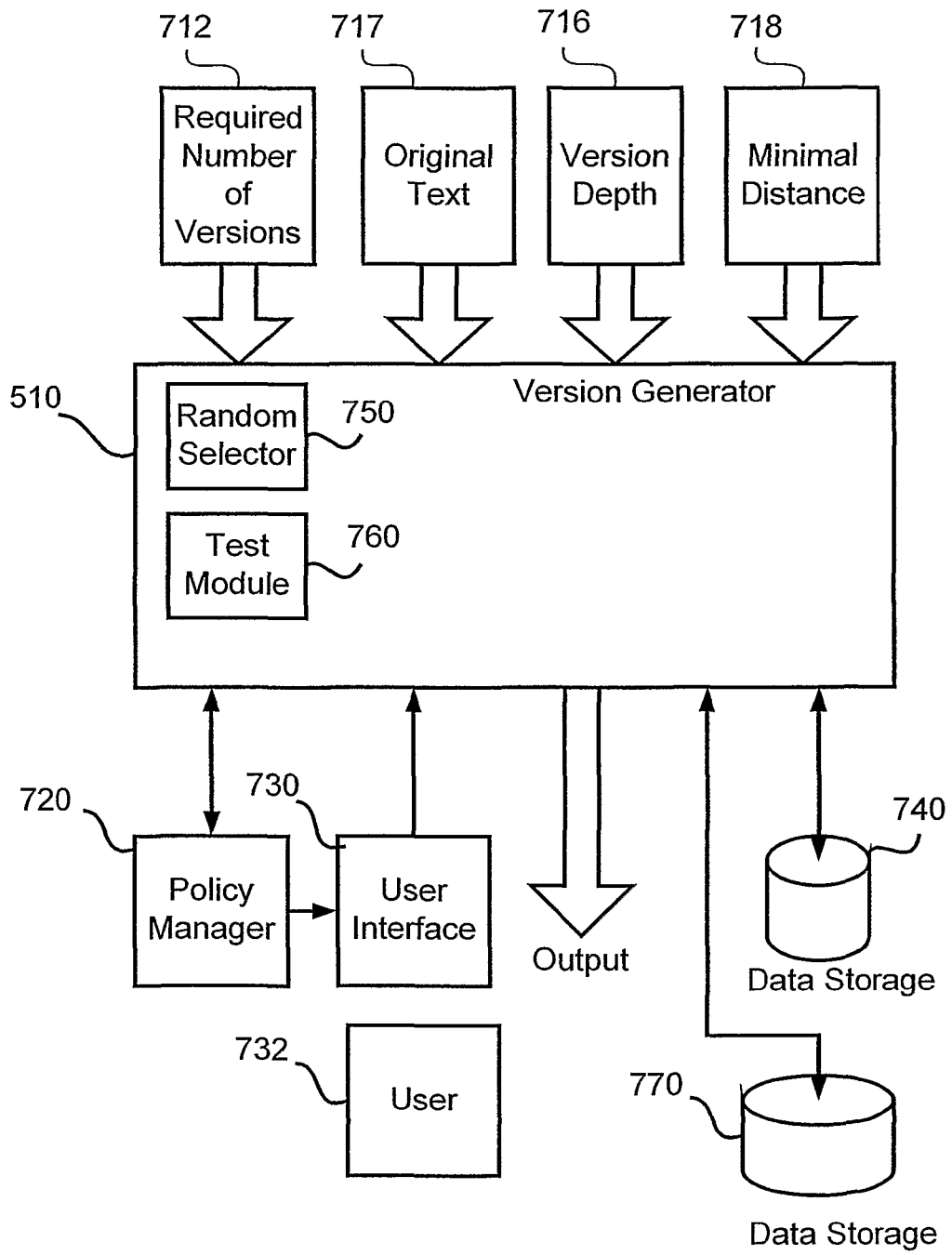
FIG. 7 is a simplified block diagram that represents the function of the version generator, in accordance with a preferred embodiment of the present invention.

Turning now to FIG. 7, there is illustrated a block diagram that represents the function of the version generator, in accordance with a preferred embodiment of the present invention. The version generator 510 of the document-handling system 500 gets as inputs the original text, the required number of versions, the minimal distance between versions and the allowed depth of versioning, where "deeper versioning" refer to more substantial modifications in the text. The policy manager 720 provides rules regarding which modifications require an approval from the creator or an authorized party (e.g. operator, administrator). If an approval is required, the user interface 730 prompt the user with a suggestion for modifications and asks for approval. The data storage 740 contains all the approved modifications that can be used for versioning. The total possible number of personalized copies is the product of the number of modifications of each optional position. E.g., if, within a paragraph there are four possible modifications for punctuation, three possible synonyms for a given word and two possible spellings of another given word, then there are total of $4*3*2=24$ possible versions. In order to provide for a sufficient level of redundancy, which is needed for error correction and robustness, the total number of possible versions should be significantly larger then the required number of versions, such that between any two different users, the minimal number of modifications would exceed a certain threshold value $\Theta$, which may be provided by the user or an authorized party (e.g. operator, administrator). If the total number of possible versions is significantly larger then the required number of versions, then it is probably sufficient to create the various versions by randomly selected between the possible modifications using the random selector 750 and checking afterwards that the minimal distance is indeed larger then $\Theta$ using the testing module 760. Otherwise one can use one of the numerous error-correction codes available. The modifications that characterize each version are stored in the database 770.

It is important to note that the aforementioned level is not a linear scale, but rather a set of allowed methods and restrictions for using those methods (e.g. no more than 2 typos in a paragraph).

Note that the impact of modifications may be application, or context depended—e.g., modifications in punctuation in a source code of a computer program may affect the result of its compilation and may cause it to cease functioning altogether—e.g. by causing a syntax error.

It is also important to note, that in some applications there may not be as many degrees of freedom as needed to satisfy the set constraints, which may result in either changing or reducing constraints (automatically, manually or a combination of both), or a failure to embed all the necessary data (either embedding partial information, or none at all). An implementation may need to address this issue according to the specific application in question (e.g. to fail the whole versioning process, then denying access to the text or alerting an operator that changes to the configuration need to be made).

Figure 8:
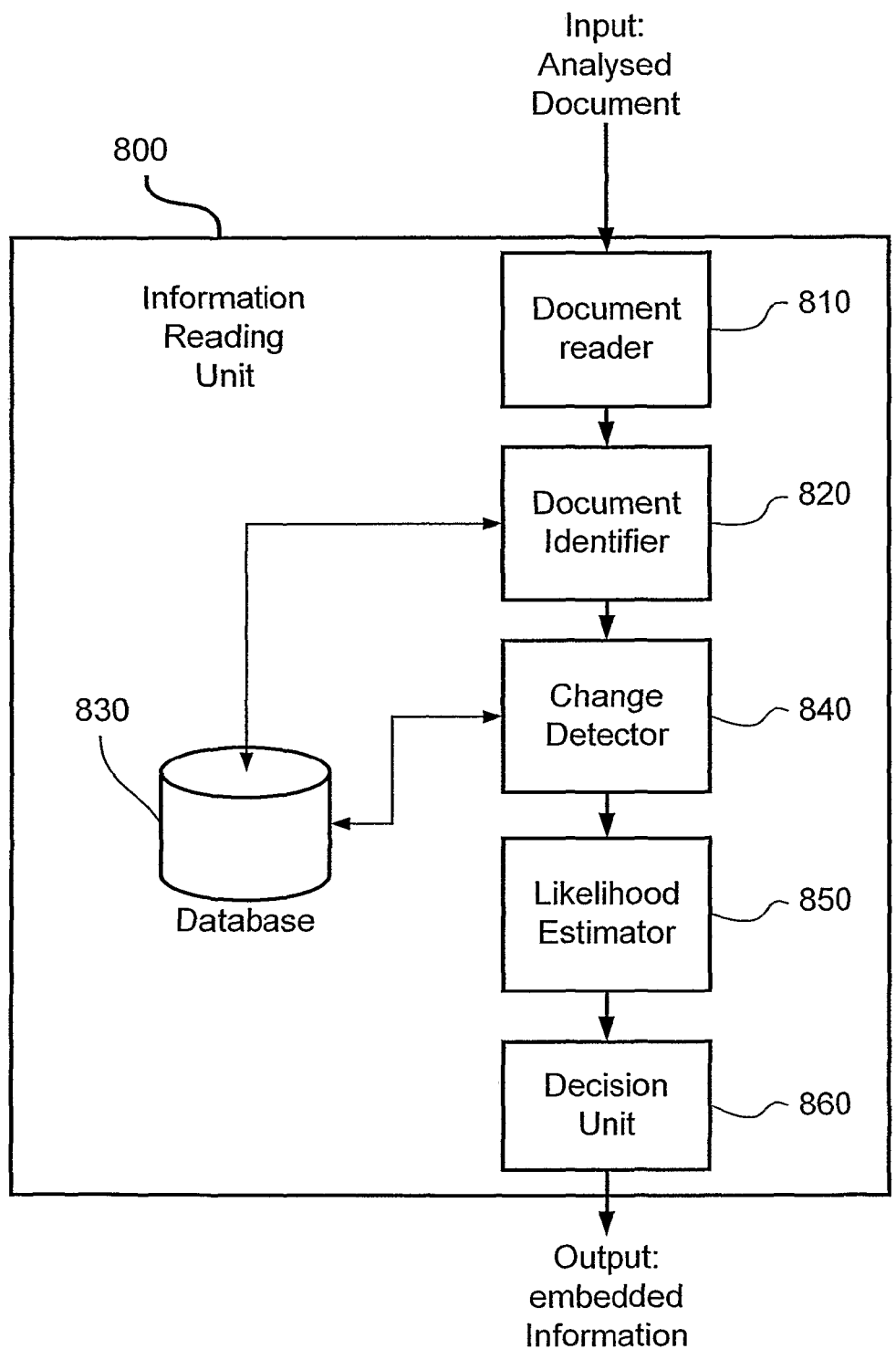
FIG. 8, is a simplified diagram showing a hidden information reading unit, constructed and operative according to a preferred embodiment of the present invention.

Also, it is noted that in general, specific handling of versions of specialized types of text (e.g. poems and sonnets, code of specific programming languages, spreadsheet data, a combination of several domains, etc.) may need both classification of the type of the text, and specialized parsing in order to identify changeable positions. Classification of the type of the text may also be needed in order to employ the correct policy for handling the content Turning now to FIG. 8, there is illustrated a hidden information reading unit 800, constructed and operative according to a preferred embodiment of the present invention. The document reader 810 reads the analyzed document and the document identifier 820 attempts to identify the document (e.g., using file meta-data or based on the textual content of the document), preferably using the data in the database 830. If the document was found to be one on which hidden information is embedded, then the modifications detector 840 goes over all the positions on which two or more modifications were embedded and attempts to detect which version was embedded. The results are then sent to the maximum likelihood estimator 850, which estimates the likelihood of the most probable sequences of modifications that comprise the hidden information. This is especially important in cases where the document has undergone substantial changes due to editing and/or malicious attacks. The decision unit 860 use the likelihood information in order to decide which hidden information is embedded in the analyzed document, and possibly also to determine the personalized version that is most likely to be the source of the analyzed document. The output from the reader is provided in the form of embedded information.

Figure 9:
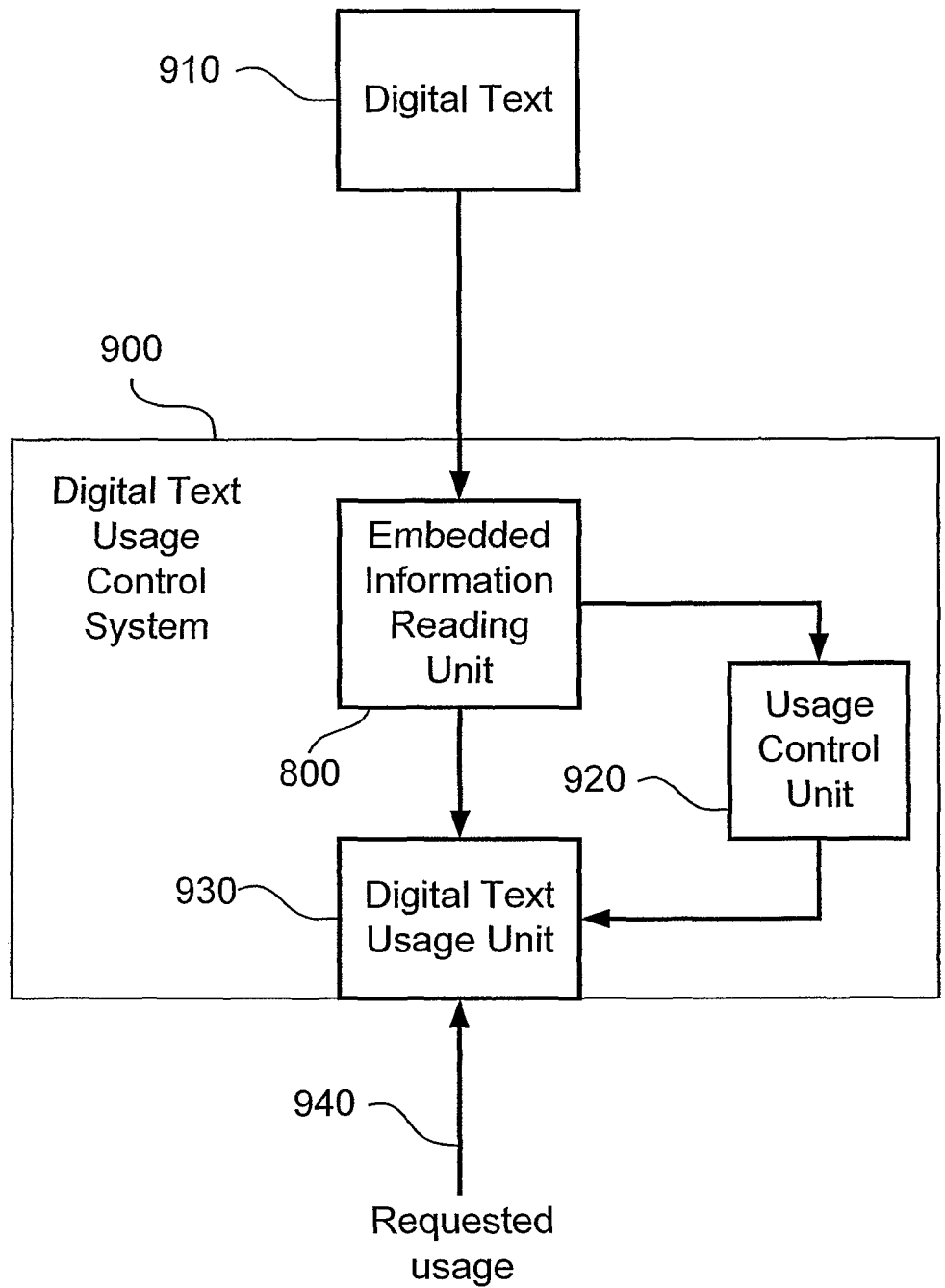
FIG. 9 is a simplified diagram illustrating a digital text usage control system, constructed and operative according to a preferred embodiment of the present invention.

Turning now to FIG. 9, there is illustrated a digital text usage control system 900, constructed and operative according to a preferred embodiment of the present invention. The embedded information-reading unit 800 reads digital text 910. Usage control unit 920 obtains information from the information reading unit 800 and determines permitted usage of the digital text 910. The permitted usage is typically one or more of the following: viewing the digital text, editing the digital text, transferring the digital text and storing the digital text. The usage control unit 920 then instructs the digital text usage unit 930 whether to allow a requested usage 940.

Other limitations may include the following: limitations about the time in which it is allowable to use the digital text; limitations about where it is allowable to use the digital text; limitations about how it is allowable to use the digital text; and limitations about who is allowed to use the digital text.

The usage limitations may be contingent on any one of a number of factors including the following: the identity of the user; usage rights granted to the user; the identity or nature of the digital text; the risks associated with the usage; the security mechanisms used involved in using the text; and the type of usage that is being attempted. Thus, for example very different usage regimes are likely where the main concern is copyright violation or where the main concern is the leaking out of commercially sensitive information or of sensitive security information.

In another embodiment of the present invention, the information is embedded in the text in a manner that does not require actual use of the original document or of any other reference document in order to read the embedded information In the watermark embedding literature, this method is referred to as an oblivious reading. To illustrate the implementation of such a method, one may consider each occurrence of "that" being replaced by "which" or vice versa, as a place in which a bit is embedded, and consider an occurrence of "that" in this position as "1" and an occurrence of "which" as "0". The message is encoded using an error-detection code and an error-correction code, so that only a very small fraction of the possible strings of zeros and ones are legitimate. While reading, the reader renders a string of ones and zeros. If the string is legitimate, then it is assumed that the detected message was indeed embedded in the text. Thus the investigation of legitimacy is carried out without reference to another version. Note that oblivious methods are, by nature, less robust then non-oblivious methods. These methods enable avoiding or at least reducing usage of databases and are especially useful when embedding is done in a distributed manner without the ability to contact a central database. An alternative approach is to use a distributed scheme where multiple databases are used, and where the embedded information also contains the index of the database.

In another embodiment of the present invention, the embedded information is used as a reactive measure for copyright protection of digital books ("e-books") and other copyrighted textual content. The embedded information can be used as forensic measure in order to trace an authorized user that distributes textual content in an unauthorized manner, thereby providing an effective deterrence against unauthorized distribution.

It is appreciated that one or more steps of any of the methods described herein may be implemented in a different order than that shown, while not departing from the spirit and scope of the invention.

While the present invention may or may not have been described with reference to specific hardware or software, the present invention has been described in a manner sufficient to enable persons having ordinary skill in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for automatically embedding information in a digital text, said method comprising:
   classifying a type of said digital text;
   identifying a plurality of portions of said digital text that are suitable for introducing modifications into said portions of said digital text;
   identifying respective textual modifications suitable for introduction into at least some of said suitable portions of said digital text, wherein a textual modification comprises replacing a portion of digital text with a specified alternate portion of digital text, said identifying respective textual modifications being in accordance with said classified type of said digital text;
   selecting at least some of said identified modifications for introduction into said digital text, said selection of said modifications being operable to represent said information; and
   performing said selected modifications on said digital text, thereby to embed said information.

2. A method according to claim 1, wherein said specified alternate portion of digital text comprises a digital text having an alternate spelling from said replaced portion of digital text.

3. A method according to claim 1, wherein said identified modifications further include at least one of the following:
   replacing a character with a substantially similar looking character;
   replacing a character with a similarly looking character, wherein said characters only differ in their Unicode representation; and
   replacing an unprintable character.

4. A method according to claim 1, wherein said identified modifications further include at least one of the following:
   modifying the number of spaces between paragraphs;
   modifying the number of spaces between lines;
   modifying the number of tabs at a line ending;
   modifying the size of spaces between words;
   modifying the size of spaces between paragraphs;
   modifying the size of spaces between lines;

modifying the number of spaces representing a tab character;
modifying the place of a tab;
replacing a tab character with at least one space; and
replacing at least one space with a tab character.

5. A method according to claim 1, wherein said identified modifications further include at least one of the following:
modifying the font of at least one character;
modifying the color of at least one character;
modifying the size of at least one character;
modifying the background of said digital text;
modifying the background of at least one character;
modifying the internal logical division in the digital representation of said digital content;
modifying the classification of a unit in the internal logical division in the digital representation of said digital content;
modifying a property of a unit in the internal logical division in the digital representation of said digital content; and
modifying the classification of a paragraph.

6. A method according to claim 1, wherein said identified modifications further include at least one of the following:
exchanging between an acronym and full verbatim versions of said acronym; and
exchanging between at least one shortened version of a word and the full version of said word;
exchanging between a correct version of a word and at least one other word, said other words have similar pronunciation to said correct word;
exchanges between synonyms;
modifications that effect an order of words; and
modifications that effect an order of paragraphs.

7. A method according to claim 1, wherein said identified modifications further include at least one of the following:
removing at least one word;
adding at least one word;
modifications to diagrams embedded in said digital text;
removal of diagrams embedded in said digital text;
exchanging between at least two different grammatical structures; and
modifying the phrasing of at least a part of said digital text such that the modified phrasing remains similar to the original version.

8. A method according to claim 1, wherein said embedded information comprises information for identifying at least one entry in a database, said database entry comprising additional information.

9. A method according to claim 1, wherein said embedded information comprises information for identifying at least one user of said digital text.

10. A method according to claim 1, comprising selecting different combinations of said modifications to form differing respective copies of said digital text for a plurality of users of said digital text, said different combinations of embedded information uniquely identifying a respective user of each copy.

11. A method according to claim 1, wherein said identifying positions in said digital text distributes said selected modifications such that all portions of said digital text larger than a predetermined size comprise sufficient embedded information to reconstruct a predetermined subset of said embedded information.

12. A method according to claim 1, wherein said identifying positions in said digital text distributes said selected modifications such that removal of a predetermined number of said positions from said digital text results in significant degradation of the value of said digital text.

13. A method according to claim 1, wherein said selecting of identified modifications groups a plurality of said identified modifications together, said group of modifications being performed in unison to obtain a version of said digital text.

14. A method according to claim 1, wherein at least part of said embedded information is encoded using at least one of the following: error detection code, error correction code, cryptographic signature and cryptographic encryption.

15. A method according to claim 1, wherein said identifying suitable modifications comprises maintaining a required quality of said digital text and a resemblance of said modified text to an original version of said digital text.

16. A method according to claim 1, wherein said embedded information contains at least one of the following: versioning information, editing history information, forensics information, transfer history information and information operable to identify and categorize said digital text.

17. A method for automatically embedding information in a digital text, said method comprising:
classifying a type of said digital text;
identifying a plurality of portions of said digital text, that are suitable for introducing textual modifications into said portions of said digital text;
identifying respective textual modifications suitable for introduction into at least some of said suitable portions of said digital text, wherein said identified modifications comprise replacing a text of at least one word within a specified one of said portions with a text of at least one specified replacement word, said identifying respective textual modifications being in accordance with said classified type of said digital text;
selecting at least some of said identified modifications for introduction into said digital text, said selection of said modifications being operable to represent said information, selected modifications comprising at least one of said identified word replacement modification; and
performing said selected modifications on said digital text, thereby to embed said information,
and wherein said selected modifications maintain a meaning of said digital text.

18. A method according to claim 17, wherein said replacement words have a substantially equivalent meaning to said respective replaced words.

19. A method according to claim 17, wherein said identifying positions in said digital text distributes said selected modifications such that all portions of said digital text larger than a predetermined size comprise sufficient embedded information to reconstruct a predetermined subset of said embedded information.

20. A method according to claim 17, wherein said identifying positions in said digital text distributes said selected modifications such that removal of a predetermined number of said positions from said digital text results in significant degradation of the value of said digital text.

21. A method for providing identifiable copies of a digital text, said method comprising:
classifying a type of said digital text;
identifying a plurality of portions of said digital text suitable for introducing textual modifications into said digital text;
identifying respective textual modifications suitable for introduction into at least some of said suitable portions of said digital text, wherein a textual modification comprises replacing a portion of digital text with a specified alternate portion of digital text, said identifying respective textual modifications being in accordance with said classified type of said digital text;

selecting different combinations of said modifications to form different copies of said digital text, said different combinations of modifications being operable to uniquely identify a respective copy;

selecting one of said combinations of modifications for introduction into said digital text; and performing said selected modifications to obtain an identifiable copy of said digital text.

22. A method according to claim 21, further comprising providing an identifiable copy of said digital text to a respective user, thereby to enable identification of a respective user from a provided copy of said digital text.

23. A method according to claim 21, further comprising associating an identifier with each of said combinations of modifications.

24. A method according to claim 21, wherein said selected modifications represent information for embedding in said digital text and said identifying positions in said digital text distributes said selected modifications such that all portions of said digital text larger than a predetermined size comprise sufficient embedded information to reconstruct a predetermined subset of said embedded information.

25. A method according to claim 21, wherein said selected modifications represent information for embedding in said digital text and said embedded information is substantially imperceptible.

26. A method according to claim 1, wherein said specified alternate portion of digital text comprises a digital text having an alternate punctuation from said replaced portion of digital text.

27. A method according to claim 26, wherein said alternate punctuation comprises at least one of the following:
   i. inserting a comma within said portion;
   ii. deleting a comma from said portion;
   iii. replacing a comma within said portion with a semicolon; and
   iv. concatenating a plurality of sentences within said portion, said sentences being separated by a punctuation mark.

28. A method according to claim 2, wherein said alternate spelling comprises at least one of the following:

exchanging a word within said portion of said digital text with a word having different valid spelling of the same word;

exchanging a word within said portion of said digital text with a word having an invalid spelling of said word; and exchanging between versions of a word within said portion of said digital text, wherein said word is built from at least two words, said versions comprising a concatenated version, a version that uses a hyphen for separation and a version separated by a space.

* * * * *